S. R. Owen,
Earth Scraper.
No. 106,865. Patented Aug. 30. 1870.
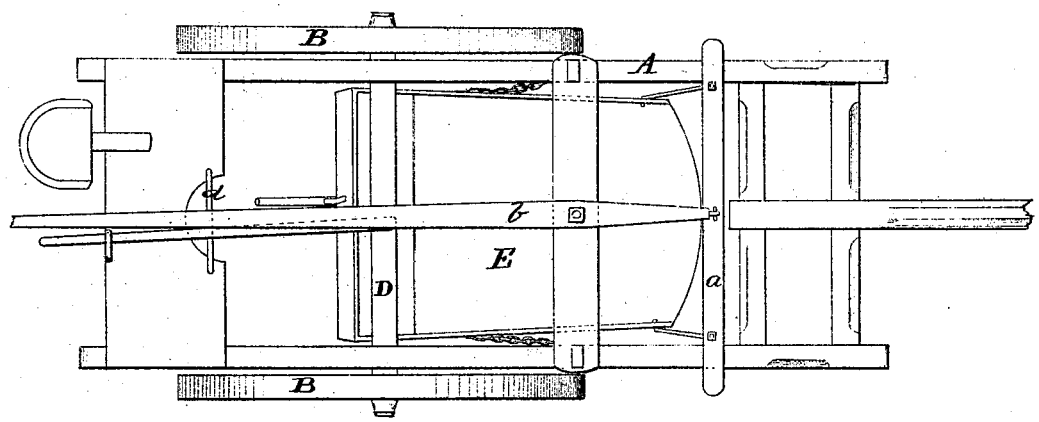
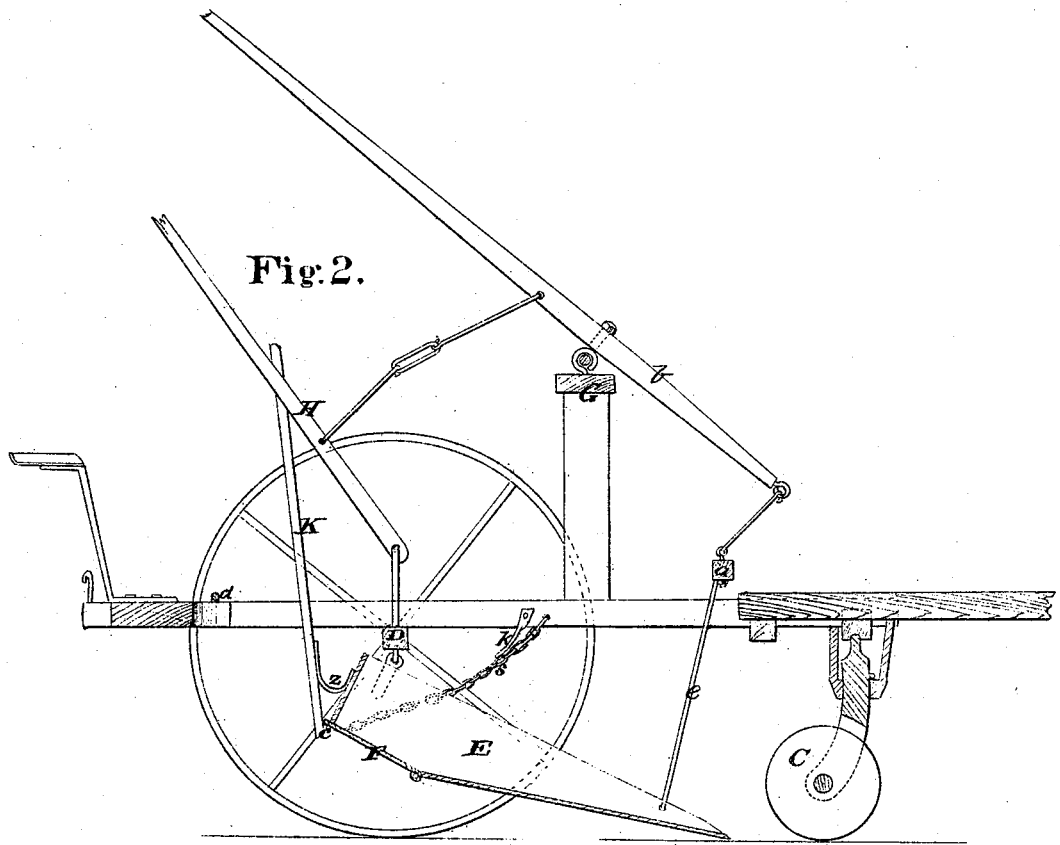
Fig. 2.
Witnesses.
Villette Anderson
Chas. Kenyon
Inventor:
S. R. Owen
Chipman Hosmer & Co.
Attorneys.

United States Patent Office.

SILAS R. OWEN, OF STEWARTSVILLE, MISSOURI.

Letters Patent No. 106,865, dated August 30, 1870.

IMPROVEMENT IN EARTH-SCRAPER.

The Schedule referred to in these Letters Patent and making part of the same.

*To all whom it may concern:*

Be it known that I, SILAS R. OWEN, of Stewartsville, in the county of DeKalb and State of Missouri, have invented a new and valuable Improvement in Earth-Scoops; and I do hereby declare that the following is a full, clear, and exact description of the construction and operation of the same, reference being had to the annexed drawing making a part of this specification, and to the letters and figures of reference marked thereon.

Figure 1 of the drawing is a top view of my invention.

Figure 2 is a central vertical longitudinal section thereof.

My invention relates to means for cleaning roads and streets, and consists in the construction and novel arrangement of devices constituting a sulky earth-scraper, whereby the driver can adjust the scoop to gather the loose earth, soil, &c., and can deposit the load thereof at any desired point without leaving his seat.

The letter A of the drawing represents the frame of my sulky-scraper, provided with wheels B B and a front roller or small wheel C.

D represents the axle, to which the scoop E is hinged, near the rear end.

The rear portion of the bottom of the scoop is hinged to form a gate, F, to the opening through which the load is dumped.

The toe of the scraper E is attached, by the rods $e$ $e$, to the horizontal bar $a$, connected to the long operating lever $b$.

This lever $b$ is hinged to the fulcrum G, and is designed to raise or depress the toe of the scoop, as the case may be.

A small lever, H, is attached to the axle, and connected to the long lever $b$, for the purpose of enabling the driver to draw it down within reach when he wishes to raise the scoop.

K represents a catch-lever, provided with a hook, $c$, at its lower end, and attached to the rear end of the scoop by means of a spring, $z$, arranged to keep the hook $c$ always ready to receive the edge of the gate F. When it is desired to deposit the load, the gate is automatically unfastened by the lifting of the scoop.

The upper end of the catch-lever is pressed toward the scoop by the rod $d$ in the floor of the sulky, and the lower end thereby thrown off from the gate, releasing it.

Chains, $s$ $s$, are arranged to connect the rear end of the gate with the bars of the sulky-frame in front of the axle. When the toe of the scoop is raised, these chains hang loose, and thereby allow the gate to fall freely. But when the toe is depressed, the gate is drawn up until it is caught by the catch on the end of the lever K.

Springs $k$ $k$ are attached to the side-bars of the lever, just in rear of the ends of the chains $s$ $s$, and are adapted to prevent these chains from becoming completely stretched when the scoop is lowered. The object of this arrangement is to give a certain amount of play to the toe of the scoop, and to prevent any undue strain on the chains, in case it should from any cause strike too deep into the soil.

The object of the front roller or caster C is to provide a means for relieving the horses from some of the weight. But the machine can be used with or without this wheel, as it is made easily removable.

What I claim as my invention, and desire to secure by Letters Patent, is—

The sulky earth-scoop herein described, provided with removable caster C, scoop E, with automatic gate F, levers H and $b$, spring catch K, chains $s$ $s$, and spring stops $k$ $k$, all constructed and arranged to operate substantially as and for the purposes herein set forth.

In testimony that I claim the above, I have hereunto subscribed my name in the presence of two witnesses.

S. R. OWEN.

Witnesses:
 J. A. WINSTEAD,
 CAPT. WM. SIFERS.